(12) United States Patent
Nada

(10) Patent No.: US 7,431,111 B2
(45) Date of Patent: Oct. 7, 2008

(54) HYBRID POWER OUTPUT APPARATUS AND CONTROL METHOD

(75) Inventor: Mitsuhiro Nada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 207 days.

(21) Appl. No.: 10/563,479

(22) PCT Filed: Jul. 14, 2004

(86) PCT No.: PCT/JP2004/010276

§ 371 (c)(1),
(2), (4) Date: Jan. 5, 2006

(87) PCT Pub. No.: WO2005/012029

PCT Pub. Date: Feb. 10, 2005

(65) Prior Publication Data

US 2006/0172843 A1 Aug. 3, 2006

(30) Foreign Application Priority Data

Jul. 30, 2003 (JP) ............... 2003-203737

(51) Int. Cl.
*B60W 20/00* (2006.01)
(52) U.S. Cl. ............ 180/65.2; 320/132; 903/930; 903/941; 903/942
(58) Field of Classification Search ............... 180/65.2, 180/65.3, 65.4; 903/941, 942, 943; 320/132
See application file for complete search history.

(56) References Cited

U.S. PATENT DOCUMENTS

| 5,804,947 | A | 9/1998 | Nii et al. | |
|---|---|---|---|---|
| 5,907,191 | A | 5/1999 | Sasaki et al. | |
| 5,935,040 | A * | 8/1999 | Tabata et al. ............ | 477/3 |
| 5,936,312 | A | 8/1999 | Koide et al. | |
| 6,087,734 | A | 7/2000 | Maeda et al. | |
| 6,109,237 | A | 8/2000 | Pels et al. | |
| 6,378,636 | B1 | 4/2002 | Worrel | |
| 6,664,651 | B1 * | 12/2003 | Kotre et al. ............ | 290/29 |
| 6,691,809 | B2 * | 2/2004 | Hata et al. ............ | 180/65.3 |
| 6,700,213 | B1 * | 3/2004 | Wakashiro et al. ....... | 290/40 C |
| 6,739,418 | B2 * | 5/2004 | Ogata et al. ............ | 180/65.2 |
| 6,757,599 | B2 * | 6/2004 | Nada ..................... | 701/29 |
| 6,805,211 | B2 * | 10/2004 | Fujikawa .............. | 180/65.2 |
| 6,807,476 | B2 * | 10/2004 | Ando et al. ............ | 701/110 |

(Continued)

FOREIGN PATENT DOCUMENTS

DE 101 55 744 A1 6/2003

(Continued)

*Primary Examiner*—Jeffrey J Restifo
(74) *Attorney, Agent, or Firm*—Kenyon & Kenyon LLP

(57) ABSTRACT

In response to the driver's release of an accelerator, the procedure of the invention sequentially compares an observed charge-discharge electric power Wb of a battery with two reference values Wr1 and Wr2, which are set on the basis of an input restriction Win of the battery. The procedure changes over a control mode among an ordinary state varying control (processing of and after step S160) to gradually lower a revolution speed Ne of an engine with torque output, an idling state varying control (step S220) to gradually lower the revolution speed Ne of the engine while idling the engine, and a fuel supply shutoff state varying control (step S230) to shut off fuel supply to the engine.

16 Claims, 10 Drawing Sheets

U.S. PATENT DOCUMENTS

| | | | |
|---|---|---|---|
| 6,812,670 B2 * | 11/2004 | Minamiura et al. | 320/116 |
| 6,879,902 B2 * | 4/2005 | Nada | 701/93 |
| 6,891,279 B2 * | 5/2005 | Kazama | 290/40 C |
| 6,960,152 B2 * | 11/2005 | Aoki et al. | 477/3 |
| RE39,183 E * | 7/2006 | Nada | 701/82 |
| 7,104,347 B2 * | 9/2006 | Severinsky et al. | 180/65.2 |
| 7,213,665 B2 * | 5/2007 | Yamaguchi et al. | 180/65.2 |
| 7,237,634 B2 * | 7/2007 | Severinsky et al. | 180/65.2 |
| 2002/0094908 A1 | 7/2002 | Urasawa et al. | |
| 2004/0158365 A1 | 8/2004 | Tabata et al. | |

FOREIGN PATENT DOCUMENTS

| | | |
|---|---|---|
| EP | 0 829 386 A2 | 3/1998 |
| EP | 0 909 675 A2 | 4/1999 |
| EP | 1 245 422 A2 | 10/2002 |
| EP | 1 318 285 A1 | 6/2003 |
| JP | 2001-317385 | 11/2001 |

* cited by examiner

HYBRID POWER OUTPUT APPARATUS AND CONTROL METHOD

This is a 371 national phase application of PCT/JP2004/010276 filed 13 Jul. 2004, claiming priority to Japanese Patent Application No. 2003-203737 filed 30 Jul. 2003, the contents of which are incorporated herein by reference.

FIELD OF THE INVENTION

The present invention relates to a power output apparatus, a control method of the power output apparatus, and a corresponding automobile.

BACKGROUND OF THE INVENTION

A proposed power output apparatus has an engine, a planetary gear unit that includes a carrier linked with a crankshaft of the engine and a ring gear linked with a drive shaft mechanically connected to an axle, a first motor that inputs and outputs power from and to a sun gear of the planetary gear unit, a second motor that inputs and outputs power from and to the drive shaft, and a battery that supplies and receives electric power to and from the first motor and the second motor (see, for example, Japanese Patent Laid-Open Gazette No. 2001-317385). This prior art power output apparatus sets a power to be output from the engine and a power to be output to the drive shaft, in response to a power demand required by an operator, and controls the engine, the first motor, and the second motor based on the settings. In the event of an abrupt decrease in power demand required by the operator, the control of this prior art power output apparatus estimates the possibility of a successful response to a subsequent power demand required by the operator. When a failed response is expected, a greater power than a required level corresponding to the operator's subsequent power demand is set to the power to be output from the engine. This aims to enhance the response of power output to the drive shaft to the power demand required by the operator.

SUMMARY OF THE INVENTION

In this prior art power output apparatus, especially the power output apparatus mounted on a limited space like an automobile, because of the size reduction requirement of the battery, the typical control procedure rapidly lower the power to be output from the engine so as to keep the power balance, in response to an abrupt decrease in power demand required by the operator. The engine is not capable of varying its drive point as quickly as an electric device like a motor. There is accordingly fear that the battery is overcharged, before the accomplished variation of the drive point. One possible measure against the potential overcharge of the battery shuts off the fuel supply to the engine. The abrupt shutoff of the fuel supply, however, leads to a drastic change of the engine torque and may thus cause a torque shock. The abrupt shutoff of the fuel supply may also cause a poor response to the operator's subsequent requirement.

A power output apparatus of the invention is equipped with an electric power-mechanical power input-output unit that maintains or varies the driving state of an internal combustion engine and outputs at least part of power from the internal combustion engine to a drive shaft through inputs and outputs of electric power and mechanical power. The power output apparatus, a control method of the power output apparatus, and a corresponding automobile of the invention aim to prevent a potential overcharge of an accumulator like a secondary battery in response to an abrupt decrease in power demand required by an operator. The invention also aims to ensure a smooth variation in driving state of the internal combustion engine according to the state of charge of the accumulator in response to an abrupt decrease in power demand required by the operator. The invention further aims to reduce a potential torque shock due to an abrupt decrease in power demand required by the operator. The invention also aims to enhance a response to the operator's subsequent requirement after an abrupt decrease in power demand required by the operator.

In order to attain at least part of the above aims, the power output apparatus, a control method of the power output apparatus, and a corresponding automobile are constructed as follows.

The present invention is directed to a power output apparatus that outputs power to a drive shaft, the power output apparatus including: an internal combustion engine; an electric power-mechanical power input-output unit that is linked with an output shaft of the internal combustion engine and with the drive shaft to maintain or vary a driving state of the internal combustion engine and to output at least part of power from the internal combustion engine to the drive shaft through inputs and outputs of electric power and mechanical power; a motor that is capable of inputting and outputting power from and to the drive shaft; a secondary battery that is capable of supplying and receiving electric power to and from the electric power-mechanical power input-output unit and the motor; an input restriction setting module that sets an input restriction of the secondary battery; a charge-discharge electric power measurement module that measures a charge-discharge electric power used to charge the secondary battery or obtained by discharging the secondary battery; a power demand setting module that sets a power demand required to the drive shaft, in response to an operator's manipulation; a driving state varying mode changeover module that, in response to setting of an abruptly decreasing power demand by the power demand setting module, selects a driving state varying mode to vary the driving state of the internal combustion engine, based on the charge-discharge electric power measured by the charge-discharge electric power measurement module and the input restriction set by the input restriction setting module; and a controller that controls the internal combustion engine, the electric power-mechanical power input-output unit, and the motor to ensure a variation in driving state of the internal combustion engine in the selected driving state varying mode and output of a power corresponding to the setting of the power demand to the drive shaft.

In response to an abrupt decrease in power demand set by the operator's manipulation, the power output apparatus of the invention selects the driving state varying mode of the internal combustion engine, based on the measured charge-discharge electric power, which is used to charge the secondary battery or is obtained by discharging the secondary battery, and the setting of the input restriction of the secondary battery. The power output apparatus controls the internal combustion engine, the electric power-mechanical power input-output unit, and the motor to vary the driving state of the internal combustion engine in the selected driving state varying mode and to output a power corresponding to the setting of the power demand to the drive shaft. Such control smoothly varies the driving state of the internal combustion engine according to the state of charge of the secondary battery. This arrangement effectively prevents the secondary battery from being overcharged, while reducing a potential torque shock due to an abrupt decrease in power demand. The adequate selection of the driving state varying mode of the internal combustion engine enhances the response to the operator's subsequent requirement. Here setting of an abruptly decreasing power demand may be setting of a power demand to apply a braking force to the drive shaft.

In one preferable application of the power output apparatus of the invention, the driving state varying mode changeover module selects an ordinary state varying mode to gradually vary the driving state of the internal combustion engine when the measured charge-discharge electric power is less than a predetermined first electric power set on the basis of the input restriction, the driving state varying mode changeover module selecting an independent state varying mode to idle the internal combustion engine at a specified revolution speed without torque output and thereby vary the driving state of the internal combustion engine when the measured charge-discharge electric power is not less than the predetermined first electric power but is less than a predetermined second electric power set on the basis of the input restriction, the driving state varying mode changeover module selecting a fuel supply shutoff state varying mode to shut off fuel supply to the internal combustion engine and thereby vary the driving state of the internal combustion engine when the measured charge-discharge electric power is not less than the predetermined second electric power. The control of varying the driving state of the internal combustion engine in the ordinary state varying mode effectively reduces a potential torque shock and enhances a response to the operator's subsequent requirement. The control of varying the driving state of the internal combustion engine in the independent state varying mode effectively prevents overcharge of the secondary battery, while ensuring some reduction of a potential torque shock and a relatively quick response to the operator's subsequent requirement. The control of varying the driving state of the internal combustion engine in the fuel supply shutoff state varying mode effectively prevents deterioration of the battery due to potential overcharge of the battery. Here, the predetermined second electric power may be set to be a lower level or a higher level than the input restriction. The predetermined first electric power may be set to be a lower level than the input restriction.

In another preferable application of the power output apparatus of the invention, the driving state varying mode changeover module selects the driving state varying mode of the internal combustion engine, based on a degree of a variation in measured charge-discharge electric power that has reached a predetermined first electric power set on the basis of the input restriction. This application estimates the charge-discharge electric power in the immediate future, based on the degree of the variation in observed charge-discharge electric power. The driving state of the internal combustion engine is thus varied according to the estimated charge-discharge electric power. This arrangement more effectively prevents overcharge of the accumulator. In this application, the driving state varying mode changeover module may select an ordinary state varying mode to gradually vary the driving state of the internal combustion engine when the degree of the variation in measured charge-discharge electric power is less than a predetermined first level, while selecting an independent state varying mode to idle the internal combustion engine at a specified revolution speed without torque output and thereby vary the driving state of the internal combustion engine when the degree of the variation in measured charge-discharge electric power is not less than the predetermined first level but is less than a predetermined second level, and selecting a fuel supply shutoff state varying mode to shut off fuel supply to the internal combustion engine and thereby vary the driving state of the internal combustion engine when the degree of the variation in measured charge-discharge electric power is not less than the predetermined second level. The control of varying the driving state of the internal combustion engine in the ordinary state varying mode effectively reduces a potential torque shock and enhances a response to the operator's subsequent requirement. The control of varying the driving state of the internal combustion engine in the independent state varying mode effectively prevents overcharge of the secondary battery, while ensuring some reduction of a potential torque shock and a relatively quick response to the operator's subsequent requirement. The control of varying the driving state of the internal combustion engine in the fuel supply shutoff state varying mode effectively prevents deterioration of the battery due to potential overcharge of the battery. As one modified structure, the driving state varying mode changeover module may adopt the fuel supply shutoff state varying mode, regardless of the selected driving state varying mode when the measured charge-discharge electric power has reached the predetermined first electric power, on the condition that the measured charge-discharge electric power is not less than a predetermined second electric power, which is set on the basis of the input restriction to be greater than the predetermined first electric power. This arrangement more effectively prevents overcharge of the accumulator. Here, the predetermined second electric power may be set to be a lower level or a higher level than the input restriction. The predetermined first electric power may be set to be a lower level than the input restriction.

In the power output apparatus of the invention the electric power-mechanical power input-output unit may include: a three-shaft power input-output assembly that is connected with three shafts, that is, the output shaft of the internal combustion engine, the drive shaft, and a third shaft, and specifies input and output of power from and to one residual shaft among the three shafts, based on powers input and output from and to two shafts among the three shafts; and a generator that inputs and outputs power from and to the third shaft. In the power output apparatus of the invention, the electric power-mechanical power input-output unit may include a pair-rotor generator having a first rotor, which is linked with the output shaft of the internal combustion engine, and a second rotor, which is linked with the drive shaft and rotates relative to the first rotor, the pair-rotor generator outputting at least part of the power from the internal combustion engine to the drive shaft through input and output of electric power by electromagnetic interaction between the first rotor and the second rotor.

The present invention is also directed to an automobile including: an internal combustion engine; an electric power-mechanical power input-output unit that is linked with an output shaft of the internal combustion engine and with a drive shaft connecting to an axle to maintain or vary a driving state of the internal combustion engine and to output at least part of power from the internal combustion engine to the drive shaft through inputs and outputs of electric power and mechanical power; a motor that is capable of inputting and outputting power from and to the drive shaft; a secondary battery that is capable of supplying and receiving electric power to and from the electric power-mechanical power input-output unit and the motor; an input restriction setting module that sets an input restriction of the secondary battery; a charge-discharge electric power measurement module that measures a charge-discharge electric power used to charge the secondary battery or obtained by discharging the secondary battery; a power demand setting module that sets a power demand required to the drive shaft, in response to an operator's manipulation; a driving state varying mode changeover module that, in response to setting of an abruptly decreasing power demand by the power demand setting module, selects a driving state varying mode to vary the driving state of the internal combustion engine, based on the charge-discharge electric power measured by the charge-discharge electric power measurement module and the input restriction set by the input restriction setting module; and a controller that controls the internal combustion engine, the electric power-mechanical power input-output unit, and the motor to ensure a variation in driving state of the internal combustion engine in the selected driving state varying mode and output of a power corresponding to the setting of the power demand to the drive shaft. The automobile of the invention may be equipped with the power output apparatus of the invention having any of the above arrangements, where an axle is linked with the drive shaft.

The automobile of the invention has the power output apparatus of the invention in any of the above applications. The automobile of the invention accordingly exerts the similar effects to those of the power output apparatus of the invention discussed above: for example, ensuring a smooth variation in driving state of the internal combustion engine according to the state of charge of the secondary battery; preventing overcharge of the secondary battery; reducing a potential torque shock due to an abrupt decrease in power demand; and enhancing the response to the driver's subsequent requirement in the adequately selected driving state varying mode of the internal combustion engine.

The present invention is also directed to a control method of a power output apparatus that outputs power to a drive shaft, the power output apparatus including: an internal combustion engine; an electric power-mechanical power input-output unit that is linked with an output shaft of the internal combustion engine and with the drive shaft to maintain or vary a driving state of the internal combustion engine and to output at least part of power from the internal combustion engine to the drive shaft through inputs and outputs of electric power and mechanical power; a motor that is capable of inputting and outputting power from and to the drive shaft; and a secondary battery that is capable of supplying and receiving electric power to and from the electric power-mechanical power input-output unit and the motor, the control method including the steps of: (a) setting an input restriction of the secondary battery; (b) measuring a charge-discharge electric power used to charge the secondary battery or obtained by discharging the secondary battery; (c) setting a power demand required to the drive shaft, in response to an operator's manipulation; (d) in response to setting of an abruptly decreasing power demand by the step (c), selecting a driving state varying mode to vary the driving state of the internal combustion engine, based on the measured charge-discharge electric power and the setting of the input restriction; and (e) controlling the internal combustion engine, the electric power-mechanical power input-output unit, and the motor to ensure a variation in driving state of the internal combustion engine in the selected driving state varying mode and output of a power corresponding to the setting of the power demand to the drive shaft.

In response to an abrupt decrease in power demand set by the operator's manipulation, the control method of the power output apparatus of the invention selects the driving state varying mode of the internal combustion engine, based on the measured charge-discharge electric power, which is used to charge the secondary battery or is obtained by discharging the secondary battery, and the setting of the input restriction of the secondary battery. The method controls the internal combustion engine, the electric power-mechanical power input-output unit, and the motor to vary the driving state of the internal combustion engine in the selected driving state varying mode and to output a power corresponding to the setting of the power demand to the drive shaft. Such control smoothly varies the driving state of the internal combustion engine according to the state of charge of the secondary battery. This arrangement effectively prevents the secondary battery from being overcharged, while reducing a potential torque shock due to an abrupt decrease in power demand. The adequate selection of the driving state varying mode of the internal combustion engine enhances the response to the operator's subsequent requirement. Here setting of an abruptly decreasing power demand may be setting of a power demand to apply a braking force to the drive shaft.

In one preferable application of the control method of the invention, the step (d) selects an ordinary state varying mode to gradually vary the driving state of the internal combustion engine when the measured charge-discharge electric power is less than a predetermined first electric power set on the basis of the input restriction, the step (d) selecting an independent state varying mode to idle the internal combustion engine at a specified revolution speed without torque output and thereby vary the driving state of the internal combustion engine when the measured charge-discharge electric power is not less than the predetermined first electric power but is less than a predetermined second electric power set on the basis of the input restriction, the step (d) selecting a fuel supply shutoff state varying mode to shut off fuel supply to the internal combustion engine and thereby vary the driving state of the internal combustion engine when the measured charge-discharge electric power is not less than the predetermined second electric power. The control of varying the driving state of the internal combustion engine in the ordinary state varying mode effectively reduces a potential torque shock and enhances a response to the operator's subsequent requirement. The control of varying the driving state of the internal combustion engine in the independent state varying mode effectively prevents overcharge of the secondary battery, while ensuring some reduction of a potential torque shock and a relatively quick response to the operator's subsequent requirement. The control of varying the driving state of the internal combustion engine in the fuel supply shutoff state varying mode effectively prevents deterioration of the battery due to potential overcharge of the battery.

In another preferable application of the control method of the invention, the step (d) selects an ordinary state varying mode to gradually vary the driving state of the internal combustion engine when a degree of a variation in measured charge-discharge electric power, which has reached a predetermined first electric power set on the basis of the input restriction, is less than a predetermined first level, the step (d) selecting an independent state varying mode to idle the internal combustion engine at a specified revolution speed without torque output and thereby vary the driving state of the internal combustion engine when the degree of the variation in measured charge-discharge electric power is not less than the predetermined first level but is less than a predetermined second level, the step (d) selecting a fuel supply shutoff state varying mode to shut off fuel supply to the internal combustion engine and thereby vary the driving state of the internal combustion engine when the degree of the variation in measured charge-discharge electric power is not less than the predetermined second level. This application estimates the charge-discharge electric power in the immediate future, based on the degree of the variation in observed charge-discharge electric power. The driving state of the internal combustion engine is thus varied according to the estimated charge-discharge electric power. This arrangement more effectively prevents overcharge of the accumulator.

DETAILED DESCRIPTION

Figure 1:
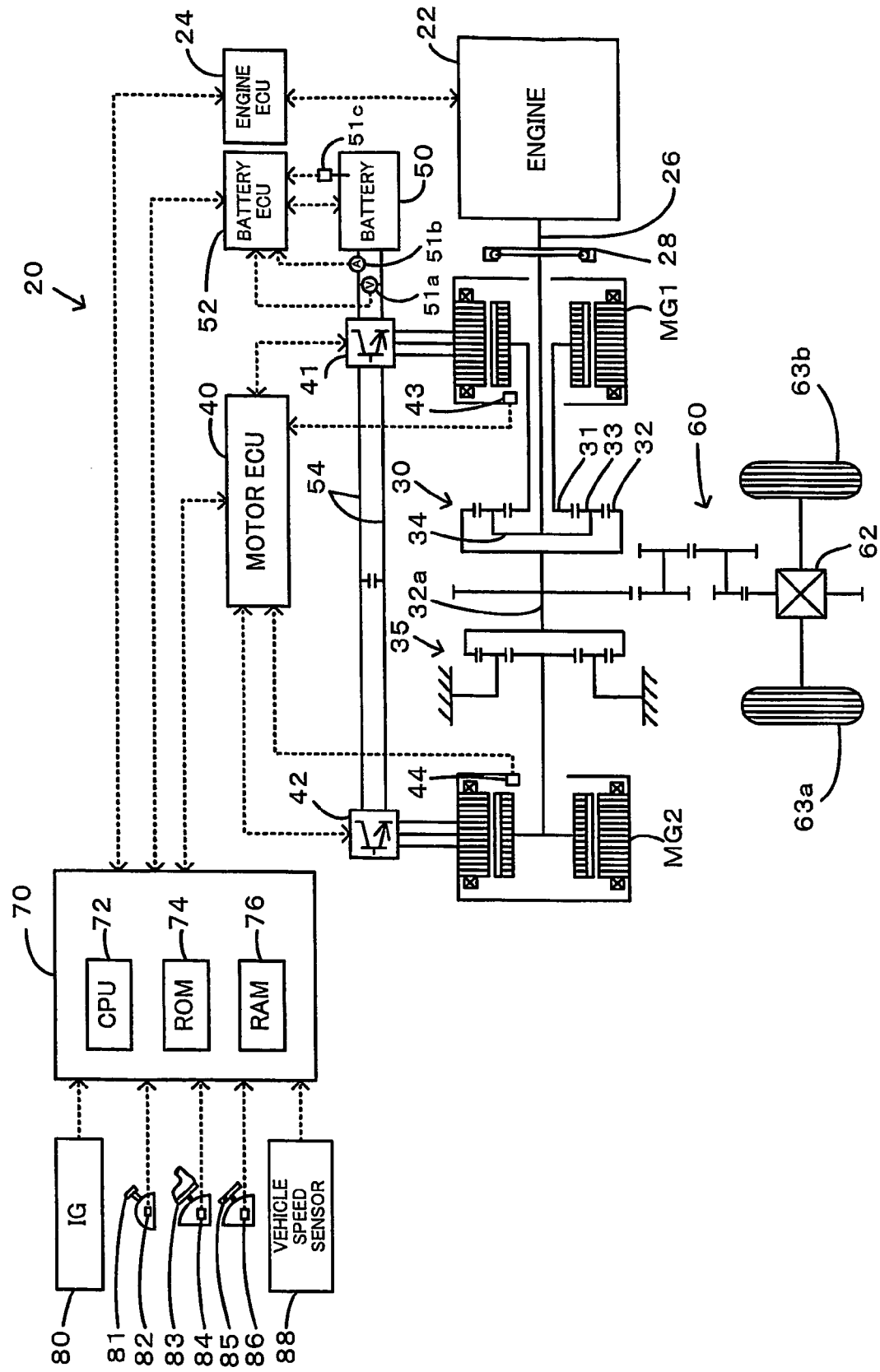
FIG. 1 schematically illustrates the construction of a hybrid vehicle 20 in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that consumes a hydrocarbon fuel, such as gasoline or light oil, to output power and is under control of an engine electronic control unit (hereafter referred to as engine ECU) 24. The engine ECU 24 receives input signals from various sensors detecting the driving conditions of the engine 22 and carries out operation control including fuel injection control, ignition control, and intake air flow regulation. The engine ECU 24 communicates with the hybrid electronic control unit 70 and receives control signals from the hybrid electronic control unit 70 to control the operations of the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via the ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is finally transmitted to the driving wheels 63a, 63b via the gear mechanism 60 and differential gear 62 from ring gear shaft 32a.

Both of the motors MG1 and MG2 are constructed as known synchronous generator motors, which are driven as an electric generator as well as an electric motor. The motors MG1 and MG2 transmit electric power from and to a battery 50 via inverters 41 and 42. A power line 54 connecting the inverters 41 and 42 with the battery 50 includes a positive terminal bus line and a negative terminal bus line shared by the two inverters 41 and 42. This arrangement enables the electric power generated by one of the motors MG1 and MG2 to be consumed by the other motor. The battery 50 is charged with the excess electric power of the motor MG1 or the motor MG2 and is discharged to supplement the insufficient electric power of the motor MG1 or the motor MG2. The battery 50 is neither charged not discharged when there is an electric power balance by the motors MG1 and MG2. The motors MG1 and MG2 are both driven and controlled by a motor electronic control unit (hereinafter referred to as motor ECU) 40. The motor ECU 40 receives signals required for driving and controlling the motors MG1 and MG2, for example, signals from rotational position detection sensors 43 and 44 that detect the rotational positions of rotors in the motors MG1 and MG2 and values of phase electric currents supplied to the motors MG1 and MG2 and detected by non-illustrated electric current sensors. The motor ECU 40 outputs switching control signals to the inverters 41 and 42. The motor ECU 40 communicates with the hybrid electronic control unit 70 and drives and controls the motors MG1 and MG2 in response to control signals from the hybrid electronic control unit 70 while outputting data regarding the driving conditions of the motors MG1 and MG2 to the hybrid electronic control unit 70 according to the requirements.

The battery 50 is controlled by a battery electronic control unit (hereinafter referred to as battery ECU) 52. The battery ECU 52 receives signals required for controlling the battery 50, for example, a value of inter-terminal voltage Vb measured by a voltage sensor 51a disposed between terminals of the battery 50, a value of charge discharge electric current Ib measured by an electric current sensor 51b attached to the power line 54 connecting with an output terminal of the battery 50, and a battery temperature Tb measured by a temperature sensor 51c attached to the battery 50. The battery ECU 52 outputs data regarding the conditions of the battery 50 to the hybrid electronic control unit 70 via communication according to the requirements. The battery ECU 52 computes a state of charge (SOC) from an accumulated value of the charge discharge electric current Ib measured by the electric current sensor 51b for controlling the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a required torque, which is to be output to the ring gear shaft 32a or the drive shaft, based on the accelerator opening Acc corresponding to the driver's step-on amount of the accelerator pedal 83 and the vehicle speed V. The engine 22 and the motors MG1 and MG2 are under operation control to enable power corresponding to the calculated required torque to be actually output to the ring gear shaft 32a. The operation control of the engine 22 and the motors MG1 and MG2 has multiple modes, a torque conversion drive mode, a charge-discharge drive mode, and a motor drive mode. In the torque conversion drive mode, the engine 22 is under operation control to output a power equivalent to the required power. The motors MG1 and MG2 are driven and controlled to cause the total power output from the engine 22 to be subjected to the torque conversion by means of the power distribution and integration mechanism 30 and the motors MG1 and MG2 and to be output to the ring gear shaft 32a. In the charge-discharge drive mode, the engine 22 is under operation control to output a power equivalent to the sum of the required power and an electric power used for charging and discharging the battery 50. The motors MG1 and MG2 are driven and controlled to cause all or part of the power output from the engine 22 with a charge or a discharge of the battery 50 to be subjected to the torque conversion by means of the power distribution and integration mechanism 30 and the motors MG1 and MG2 and to be output as the required power to the ring gear shaft 32a. In the motor drive mode, the operation of the engine 22 is at a stop, while the motor MG2 is driven and controlled to output a power equivalent to the required power to the ring gear shaft 32a.

Figure 2:
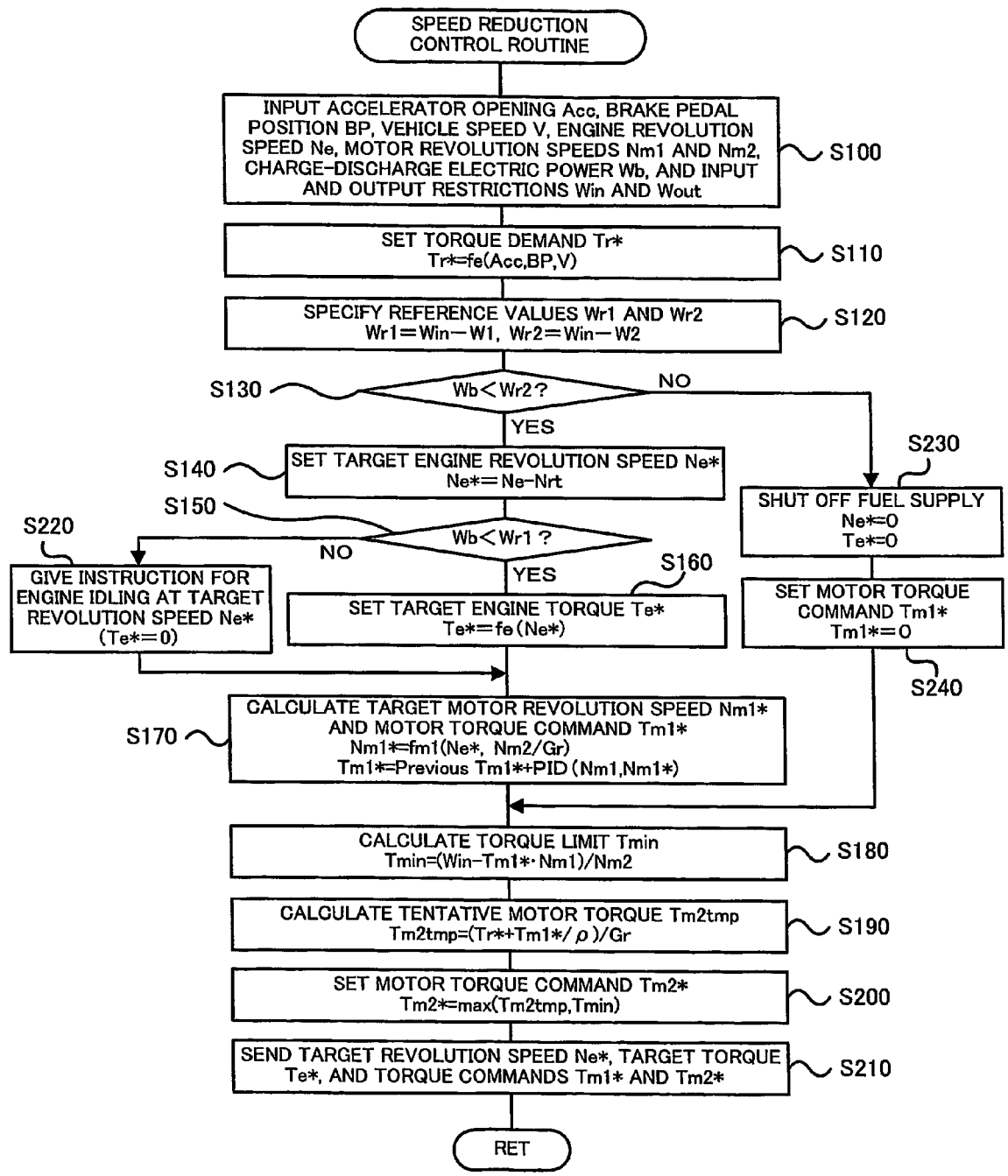
FIG. 2 is a flowchart showing a speed reduction control routine executed by a hybrid electronic control unit 70.

The following describes the operations of the hybrid vehicle 20 of the embodiment constructed as discussed above, especially the operation of speed reduction in response to release of the accelerator pedal 83. FIG. 2 is a flowchart showing a speed reduction control routine executed by the hybrid electronic control unit 70. This routine is carried out repeatedly at preset time intervals (for example, at every 8 msec) after release of the accelerator.

Figure 3:
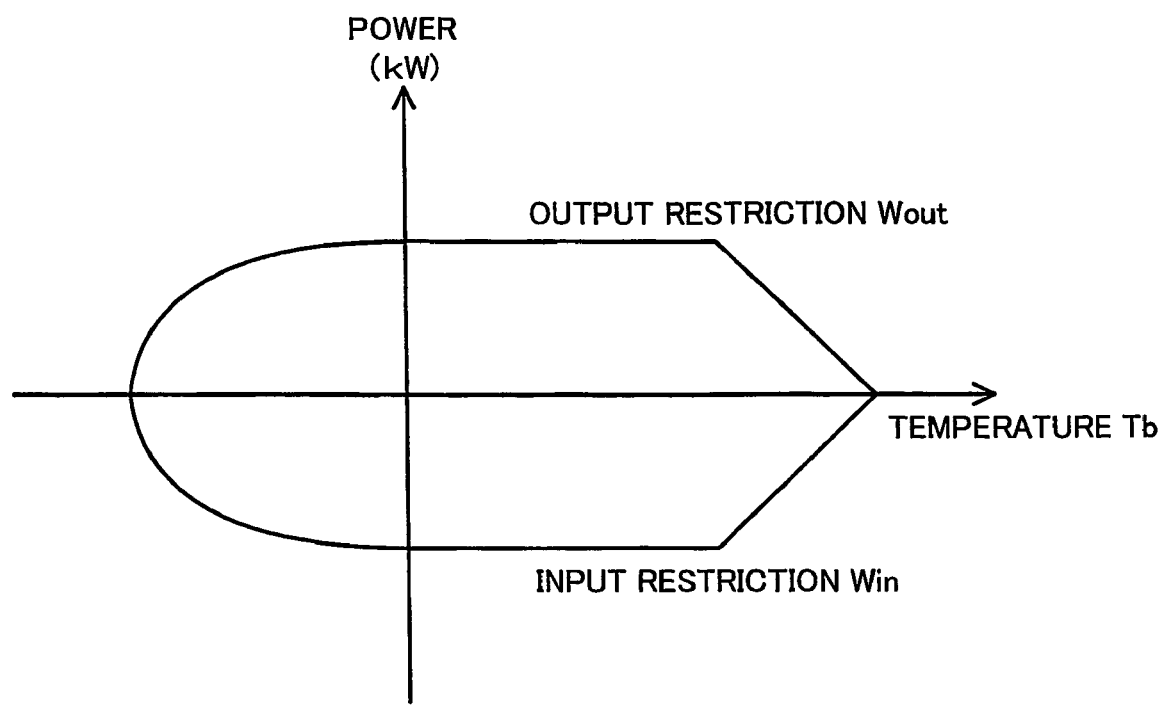
FIG. 3 shows variations in input restriction Win and output restriction Wout against battery temperature Tb of a battery 50.
Figure 4:
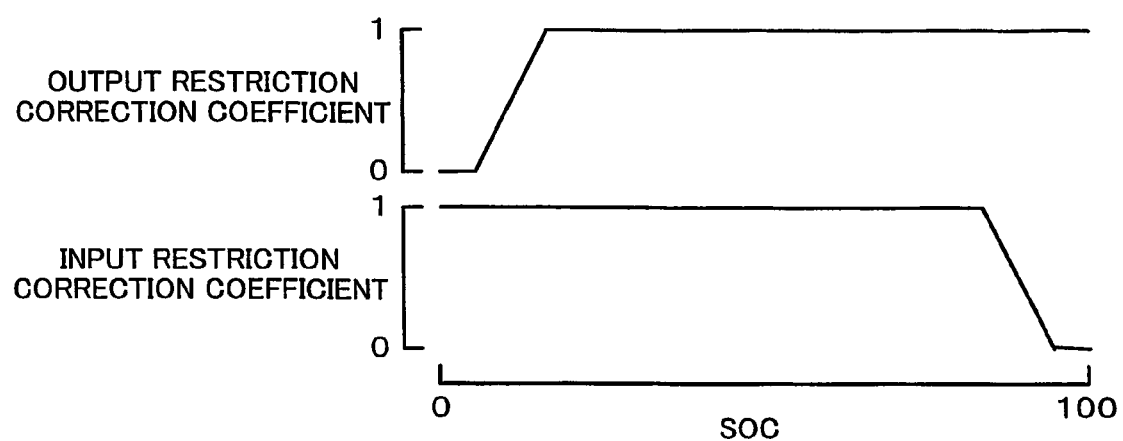
FIG. 4 shows variations in correction coefficients of the input restriction Win and the output restriction Wout against the state of charge (SOC) of the battery 50.

When the speed reduction control routine starts, the CPU 72 of the hybrid electronic control unit 70 first inputs various data required for control, that is, the accelerator opening Acc from the accelerator pedal position sensor 84, the brake pedal position BP from the brake pedal position sensor 86, the vehicle speed V from the vehicle speed sensor 88, a revolution speed Ne of the engine 22, revolution speeds Nm1 and Nm2 of the motors MG1 and MG2, charge-discharge electric power Wb of the battery 50, and input and output restrictions Win and Wout of the battery 50 (step S100). The revolution speed Ne of the engine 22 is calculated based on a signal from a non-illustrated crank position sensor attached to the crankshaft 26 and is input from the engine ECU 24 via communication. The revolution speeds Nm1 and Nm2 of the motors MG1 and MG2 are computed from the rotational positions of rotors in the motors MG1 and MG2 detected by the rotational position detection sensors 43 and 44 and are input from the motor ECU 40 via communication. The charge-discharge electric power Wb of the battery 50 is calculated as the product of the average of voltage Vb of the battery 50 measured by the voltage sensor 51a and the average of charge-discharge current Ib measured by the current sensor 51b in a preset time period (for example, in 24 msec) and is input from the battery ECU 52 via communication. Using the average of voltage Vb and the average of charge-discharge current Ib in the preset time period desirably stabilizes the charge-discharge electric power Wb. The input and output restrictions Win and Wout of the battery 50 are set according to the battery temperature Tb of the battery 50 measured by the temperature sensor 51c and the state of charge (SOC) of the battery 50 and are input from the battery ECU 52 via communication. One concrete procedure specifies reference values of the input and output restrictions Win and Wout based on the observed battery temperature Tb, determines an input restriction correction coefficient and an output restriction correction coefficient based on the state of charge (SOC) of the battery 50, and multiplies the specified reference values of the input and output restrictions Win and Wout by the respective correction coefficients to set the input and output restrictions Win and Wout of the battery 50. FIG. 3 shows variations in input restriction Win and output restriction Wout against the battery temperature Tb. FIG. 4 shows variations in correction coefficients of the input restriction Win and the output restriction Wout against the state of charge (SOC) of the battery 50.

Figure 5:
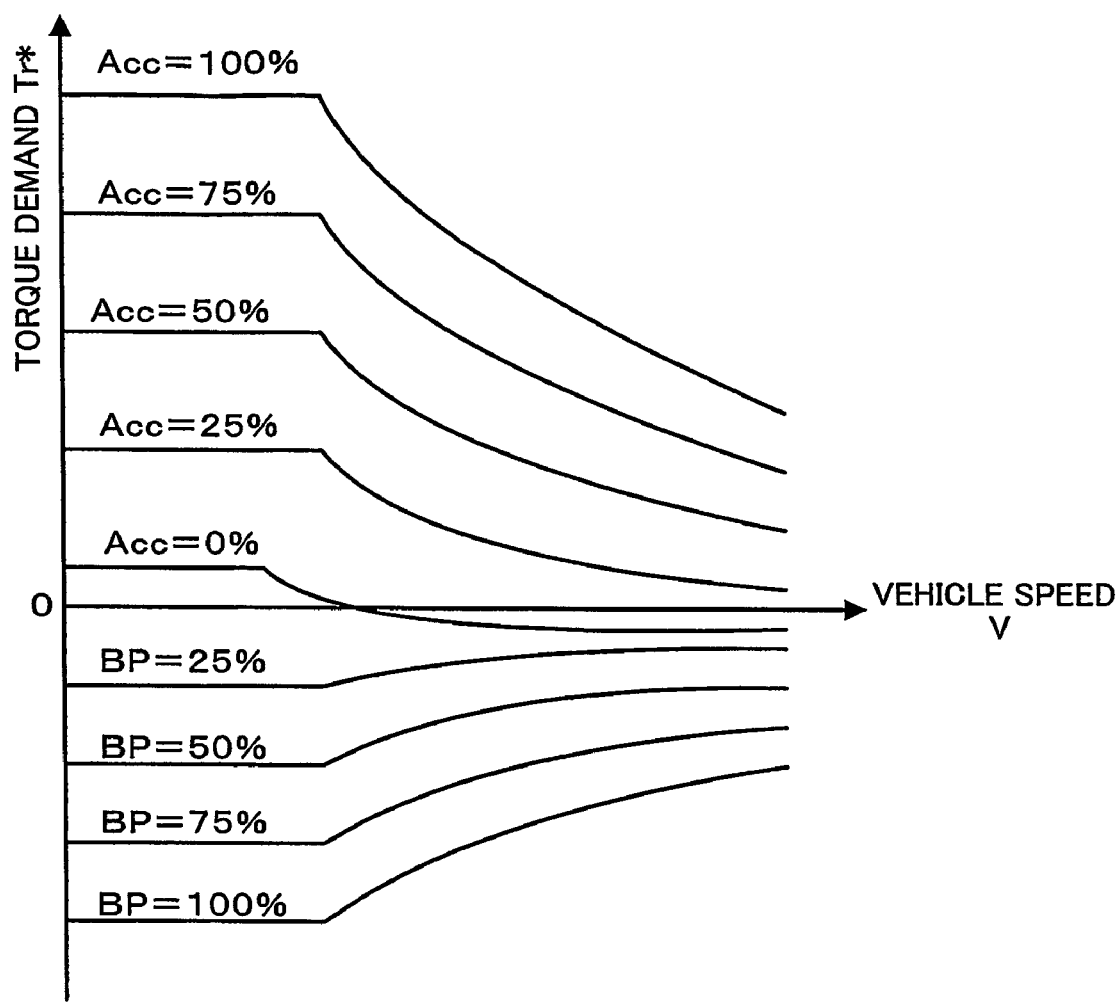
FIG. 5 shows an example of a torque demand setting map.

After the input of these data, the routine sets a torque demand Tr* to be output to the ring gear shaft 32a as the drive shaft linked with the drive wheels 63a and 63b as the torque required for the vehicle, based on the inputs of the accelerator opening Acc, the brake pedal position BP, and the vehicle speed V (step S110). In the structure of this embodiment, variations in torque demand Tr* against the accelerator opening Acc and the vehicle speed V are specified in advance and stored as a torque demand setting map in the ROM 74. The procedure of the embodiment reads and sets the torque demand Tr* corresponding to the given accelerator opening Acc and the given vehicle speed V from the stored torque demand setting map. FIG. 5 shows an example of the torque demand setting map. This speed reduction control routine is executed in the accelerator-off state. The torque demand Tr* is accordingly set as a braking torque (a negative torque), based on either of the accelerator opening Acc set equal to '0' or the brake pedal position BP.

After setting the torque demand Tr*, the routine subtracts predetermined values W1 and W2 from the input restriction Win to specify an idling reference value Wr1 and a fuel supply shutoff reference value Wr2 (step S120). The predetermined value W1 represents some surplus electric power of the battery 50 not to attain a relatively slow reduction in the revolution speed Ne of the engine 22 with power generation by the motor MG1. The predetermined value W2 represents an extremely small surplus electric power of the battery 50. Positive values may be set to both the predetermined values W1 and W2, in the case where the setting of the input restriction Win does not take into account the margin of the battery 50 at all. In the case where the setting of the input restriction Win takes into account the margin of the battery 50, on the other hand, negative values may be set to only the predetermined value W2 or to both the predetermined values W1 and W2.

After specification of the idling reference value Wr1 and the fuel supply shutoff reference value Wr2, the routine compares the input charge-discharge electric power Wb with the specified fuel supply shutoff reference value Wr2 (step S130). When the charge-discharge electric power Wb is less than the fuel supply shutoff reference value Wr2, the routine sets a value obtained by subtraction of a predetermined revolution speed Nrt from the input revolution speed Ne of the engine 22 to a target revolution speed Ne* of the engine 22 to lower the revolution speed Ne of the engine 22 by the rate process (step S140). The routine then compares the input charge-discharge electric power Wb with the specified idling reference value W1 (step S150).

Figure 6:
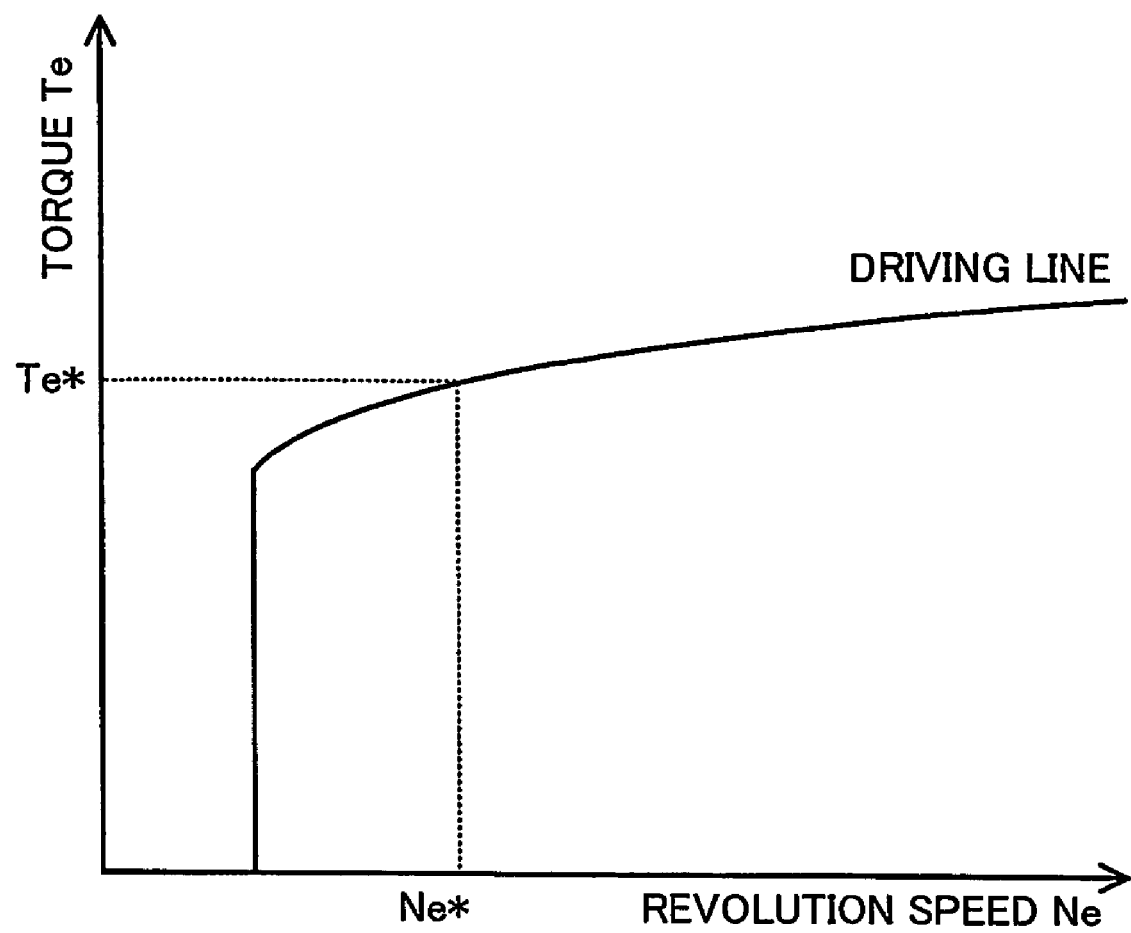
FIG. 6 shows a process of setting target torque Te* corresponding to target revolution speed Ne* on a driving line of an engine 22.

When the charge-discharge electric power Wb is less than the idling reference value Wr1, the routine determines that the battery 50 has a sufficient margin and sets a target torque Te* of the engine 22, based on the setting of the target revolution speed Ne* (step S160). In this embodiment, the target torque Te* is set as a torque corresponding to the target revolution speed Ne* of an efficient drive point on a driving line for efficiently driving the engine 22. The process of setting the target torque Te* corresponding to the target revolution speed Ne* on the driving line of the engine 22 is shown in FIG. 6.

Figure 7:
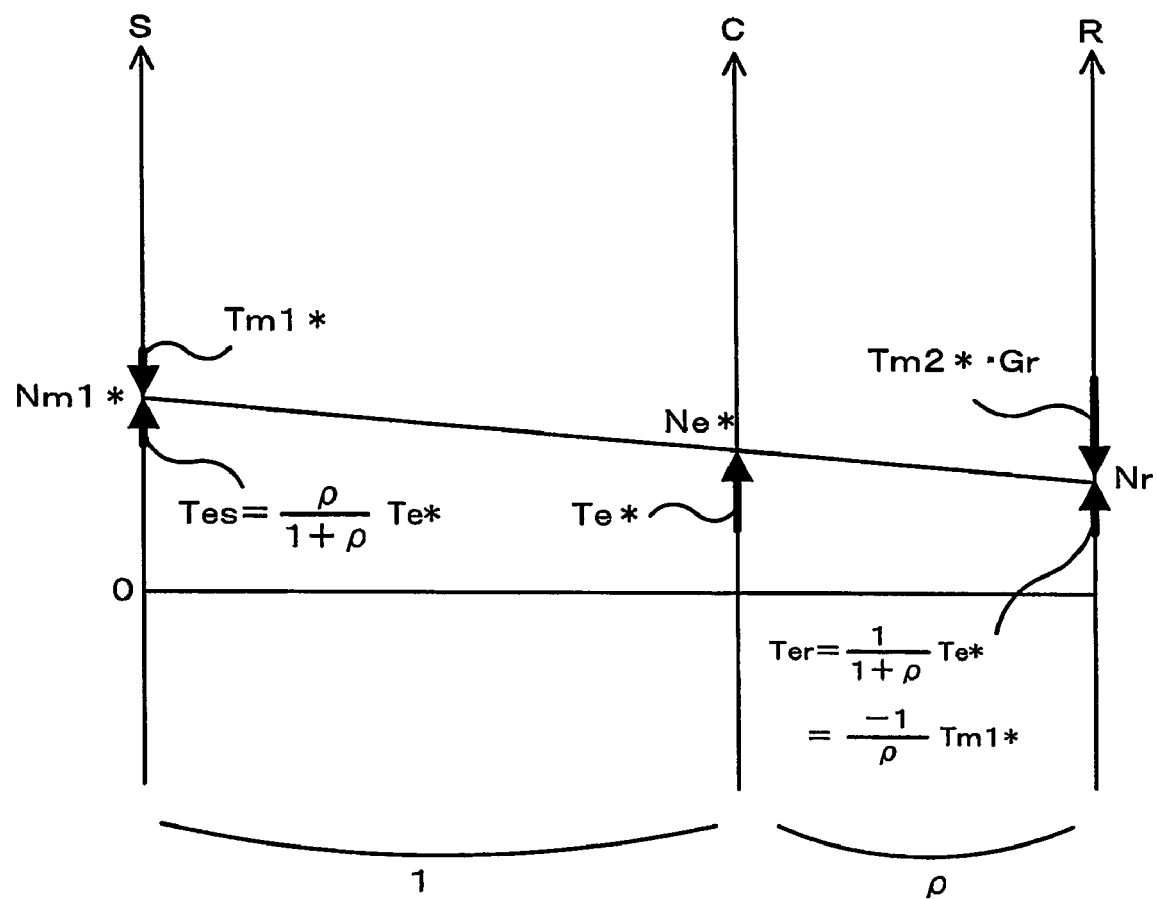
FIG. 7 is an alignment chart showing a dynamic relation with respect to rotational elements in a power distribution integration mechanism 30.

After setting the target revolution speed Ne* and the target torque Te*, the routine calculates a target revolution speed Nm1* of the motor MG1 from the setting of the target revolution speed Ne*, the revolution speed Nr (=Nm2/Gr) of the ring gear shaft 32a, and the gear ratio ρ of the power distribution integration mechanism 30 according to Equation (1) given below, and calculates a torque command Tm1* of the motor MG1 from the calculated target revolution speed Nm1* and the current revolution speed Nm1 of the motor MG1 according to Equation (2) given below (step S170). Equation (1) shows a dynamic relation of the rotational elements in the power distribution integration mechanism 30. FIG. 7 is an alignment chart showing a dynamic relation between the revolution speed and the torque with respect to the rotational elements in the power distribution integration mechanism 30. An axis S shows the revolution speed of the sun gear 31 that is equal to the revolution speed Nm1 of the motor MG1. An axis C shows the revolution speed of the carrier 34 that is equal to the revolution speed Ne of the engine 22. An axis R shows the revolution speed Nr of the ring gear 32 that is obtained by multiplying the revolution speed Nm2 of the motor MG2 by the gear ratio Gr of the reduction gear 35. Equation (1) is easily derived from this alignment chart. Two thick arrows on the axis R respectively represent a torque acting on the ring gear shaft 32a as the torque Te* output from the engine 22 is transmitted via the power distribution integration mechanism 30 while the engine 22 is steadily driven at a specific drive point defined by the target torque Te* and the target revolution speed Ne*, and a torque acting on the ring gear shaft 32a as the torque Tm2* output from the motor MG2 is transmitted via the reduction gear 35. In the course of speed reduction, the torque Tm2* output from the motor MG2 has a negative direction (a downward direction in the drawing). Both the motors MG1 and MG2 accordingly function as generators. Equation (2) shows a relation in feedback control to rotate the motor MG1 at the target revolution speed Nm1*. In Equation (2), k1 in the second term on the right side represents a gain of a proportional term and k2 in the third term on the right side represents a gain of an integral term.

$$Nm1^* = Ne^* \cdot (1+\rho)/\rho - Nm2/(Gr \cdot \rho) \tag{1}$$

$$Tm1^* = \text{Previous } Tm1^* + k1(Nm1^* - Nm1) + k2\int (Nm1^* - Nm1)dt \tag{2}$$

After calculation of the target revolution speed Nm1* and the torque command Tm1* of the motor MG1, the routine divides a difference between the input restriction Win of the battery 50 and a generated power (power consumption) of the motor MG1, which is the product of the calculated torque command Tm1* of the motor MG1 and the current revolution speed Nm1 of the motor MG1, by the current revolution speed Nm2 of the motor MG2 according to Equation (3) given below to calculate a torque limit Tmin as an allowable lower limit torque output from the motor MG2 (step S180). The routine also calculates a tentative motor torque Tm2tmp as a torque to be output from the motor MG2, from the torque demand Tr*, the torque command Tm1*, and the gear ratio ρ of the power distribution integration mechanism 30 according to Equation (4) given below (step S190), and sets the greater between the calculated torque limit Tmin and the calculated tentative motor torque Tm2tmp to a torque command Tm2* of the motor MG2 (step S200). Setting the torque command Tm2* of the motor MG2 in this manner enables the torque demand Tr* (braking torque), which is to be output to the ring gear shaft 32a as the drive shaft, to be set as a limited torque within the range of the input restriction Win of the battery 50. Equation (4) is readily derived from the alignment chart of FIG. 7 described above.

$$Tmin = (Win - Tm1^* \cdot Nm1)/Nm2 \tag{3}$$

$$Tm2tmp = (Tr^* + Tm1^*/\rho)/Gr \tag{4}$$

After setting the target revolution speed Ne* and the target torque Te* of the engine 22 and the torque commands Tm1* and Tm2* of the motors MG1 and MG2, the routine sends the target revolution speed Ne* and the target torque Te* of the engine 22 to the engine ECU 24 and the torque commands Tm1* and Tm2* of the motors MG1 and MG2 to the motor ECU 40 (step S210), before being terminated. The engine ECU 24 receives the target revolution speed Ne* and the target torque Te* and carries out fuel injection control and ignition control of the engine 22 to drive the engine 22 at a drive point defined by the target revolution speed Ne* and the target torque Te*. The motor ECU 40 receives the torque commands Tm1* and Tm2* and carries out switching control of switching elements included in the inverters 41 and 42 to drive the motor MG1 with the torque command Tm1* and to drive the motor MG2 with the torque command Tm2*.

In the continuing state where the charge-discharge electric power Wb is less than the idling reference value Wr1, the routine sets the target revolution speed Ne*, which is gradually lowered by the rate process, and the corresponding target torque Te* (steps S140 and S160), as described above. The engine 22 is then controlled to be driven at the drive point defined by the settings of the target revolution speed Ne* and the target torque Te*. The motor MG1 is controlled to output an offset torque that cancels the torque acting on the sun gear 31 in response to the output torque of the engine 22 and makes the revolution speed Ne of the engine 22 approach to the target revolution speed Ne*. The motor MG2 is controlled to output a torque that is computed by dividing the sum of the torque demand Tr* (braking torque) and an offset torque for canceling the torque acting on the ring gear shaft 32a in response to the output torque of the motor MG1 by the gear ratio Gr of the reduction gear 35 and is limited in the range of the input restriction Win. The revolution speed Ne of the engine 22 thus gradually decreases with power generation of the motor MG1. The battery 50 is accordingly charged with the generated power of the MG1 and with the regenerative power of the motor MG2. In this speed reduction state, the control procedure gradually lowers the revolution speed Ne of the engine 22 with the torque output from the engine 22. Such control ensures a prompt torque output to the ring gear shaft 32*a* as the drive shaft, in response to the driver's sudden step-on action of the accelerator pedal 83. This arrangement accordingly attains a quick response to the driver's action.

When it is determined at step S150 that the charge-discharge electric power Wb of the battery 50 is not less than the idling reference value Wr1, the routine determines that the battery 50 has a slight margin and transmits a control signal to the engine ECU 24 to idle the engine 22 at the target revolution speed Ne* (step S220). The routine then calculates the target revolution speed Nm1* of the motor MG1 from the setting of the target revolution speed Ne*, the revolution speed Nr (=Nm2/Gr) of the ring gear shaft 32*a*, and the gear ratio ρ of the power distribution integration mechanism 30 according to Equation (1) given above, and calculates the torque command Tm1* of the motor MG1 from the calculated target revolution speed Nm1* and the current revolution speed Nm1 of the motor MG1 according to Equation (2) given above (step S170). In this state, only a small torque is required to be output from the motor MG1, since the engine 22 is controlled to output the torque or to be driven at the target revolution speed Ne*. A smaller setting is thus sufficient for the gain k1 of the proportional term (the second term on the right side of Equation (2)) in the relation in feedback control used to set the torque command Tm1*, compared with the state where the charge-discharge electric power Wb is less than the idling reference value Wr1. The procedure of this embodiment accordingly sets a smaller value to the gain k1 of the proportional term for the control to idle the engine 22. The routine subsequently executes the processing of and after step S180.

In the continuing state where the charge-discharge electric power Wb is not less than the idling reference value W1 but is less than the fuel supply shutoff reference value W2, each cycle of the speed reduction control routine subtracts the predetermined revolution speed Nrt from the observed revolution speed Ne of the engine 22 at the time to set the target revolution speed Ne* of the engine 22 (step S140). The engine 22 is then controlled to be idled at the setting of the target revolution speed Ne* (step S220). The motor MG1 is controlled to output a relatively small level of the torque command Tm1*, which is set with the small gain k1 to make the revolution speed Ne of the engine 22 approach to the target revolution speed Ne*. The motor MG2 is controlled to output a torque that is computed by dividing the sum of the torque demand Tr* (braking torque) and an offset torque for canceling a relatively small level of the torque acting on the ring gear shaft 32*a* in response to the output torque of the motor MG1 by the gear ratio Gr of the reduction gear 35 and is limited in the range of the input restriction Win. The revolution speed Ne of the engine 22 thus gradually decreases with slight power generation of the motor MG1. The battery 50 is accordingly charged with the slight generated power of the MG1 and with the regenerative power of the motor MG2. In this speed reduction state, the control procedure gradually lowers the evolution speed Ne of the engine 22, while idling the engine 22. Such control ensures a relatively prompt torque output, to the ring gear shaft 32*a* as the drive shaft, in response to the driver's sudden step-on action of the accelerator pedal 83, although the torque output response is not so prompt as that in the state of gradually lowering the revolution speed Ne with the torque output of the engine 22. This arrangement accordingly attains a relatively quick response to the driver's action.

When it is determined at step S130 that the charge-discharge electric power Wb is not less than the fuel supply shutoff reference value Wr2, the routine determines that the battery 50 has only an extremely small margin and transmits a control signal to the engine ECU 24 to shut off the fuel supply to the engine 22 (step S230). The routine then sets a value '0' to the torque command Tm1* of the motor MG1 (step S240) and executes the processing of and after step S180. Since the torque command Tm1* is set equal to 0, the processing of and after step S180 sets the value that is obtained by dividing the torque demand Tr* by the gear ratio Gr of the reduction gear 35 and is limited in the range of the input restriction Win to the torque command Tm2* of the motor MG2. In this state, the fuel supply to the engine 22 is abruptly shut off. This causes a slight torque shock at a level that does not adversely affect the driving operations of the vehicle. Such a slight torque shock is unavoidable for protection of the battery 50.

In the continuing state where the charge-discharge electric power Wb is not less than the fuel supply shutoff reference value Wr2, the shutoff of fuel supply to the engine 22 continues. The engine 22 accordingly stops its operation, and the motor MG1 is controlled to output no torque. The motor MG2 is controlled to output the torque that is computed by dividing the torque demand Tr* (braking torque) by the gear ratio Gr of the reduction gear 35 and is limited in the range of the input restriction Win. The battery 50 is accordingly charged with only the regenerative power of the motor MG2. In this speed reduction state, in response to the driver's sudden step-on action of the accelerator pedal 83, such control ensures a quick torque output responding to the torque demand Tr* of a level suppliable by the motor MG2. The fuel injection control and the ignition control of the engine 22 are required, however, to fulfill the torque demand Tr* over the suppliable level by the motor MG2. The resulting delay of torque output is unavoidable for protection of the battery 50.

The input restriction Win of the battery 50 depends upon the battery temperature Tb and the state of charge (SOC) as shown in FIGS. 3 and 4. Even when the charge-discharge electric power Wb is less than the idling reference value Wr1 immediately after the release of the accelerator, the charge-discharge electric power Wb may increase to the level that is not less than the idling reference value Wr1 but is still less than the fuel supply shutoff reference value Wr2 with the variation in input restriction Win. In this case, the control of idling the engine 22 starts in the process of gradually lowering the revolution speed Ne of the engine 22. In the case where the charge discharge electric power Wb increases to the level that is not less than the fuel supply shutoff reference value Wr2 with the variation in input restriction Win, the control of shutting off the fuel supply to the engine 22 starts in the process of gradually lowering the revolution speed Ne of the engine 22. This arrangement effectively prevents the battery 50 from being charged with excessive electric power against the variation in input restriction Win of the battery 50.

As described above, the hybrid vehicle 20 of the embodiment compares the charge-discharge electric power Wb of the battery 50 with the idling reference value Wr1 and with the fuel supply shutoff reference value Wr2, which are set on the basis of the input restriction Win of the battery 50, in response to the release of the accelerator. Based on the results of the comparison, the hybrid vehicle 20 changes over the control mode among the ordinary state varying control to gradually lower the revolution speed Ne of the engine 22 with the torque output of the engine 22, the idling state varying control to gradually lower the revolution speed Ne of the engine 22 while idling the engine 22, and the fuel supply shutoff state varying control to shut off the fuel supply to the engine 22. This arrangement effectively prevents the battery 50 from being charged with excessive electric power. When the charge-discharge electric power Wb is less than the idling reference value Wr1, the ordinary state varying control is carried out to smoothly lower the revolution speed Ne of the engine 22 and to ensure a quick response to the driver's subsequent step-on action of the accelerator pedal 83. In this case, the fuel supply to the engine 22 continues, so that there is no potential torque shock due to the stop of fuel supply to the engine 22. When the charge-discharge electric power Wb is not less than the idling reference value Wr1 but is less than the fuel supply shutoff reference value Wr2, the idling state varying control is carried out to smoothly lower the revolution speed Ne of the engine 22 and to reduce the generated power by the motor MG1. This effectively prevents the battery 50 from being charged with excessive electric power, while ensuring a relatively quick response to the driver's subsequent step-on action of the accelerator pedal 83. In this case, the fuel supply to the engine 22 still continues, so that there is no potential torque shock due to the stop of fuel supply to the engine 22. When the charge-discharge electric power Wb is not less than the fuel supply shutoff reference value W2, the fuel supply shutoff state varying control is carried out to effectively prevent the battery 50 from being charged with excessive electric power.

The hybrid vehicle 20 of the embodiment gradually lowers the target revolution speed Ne* of the engine 22 by the rate process, when the charge-discharge electric power Wb is less than the fuel supply shutoff reference value Wr2. The rate process is, however, not essential, but another technique may be applied to lower the target revolution speed Ne* of the engine 22.

Figure 8:
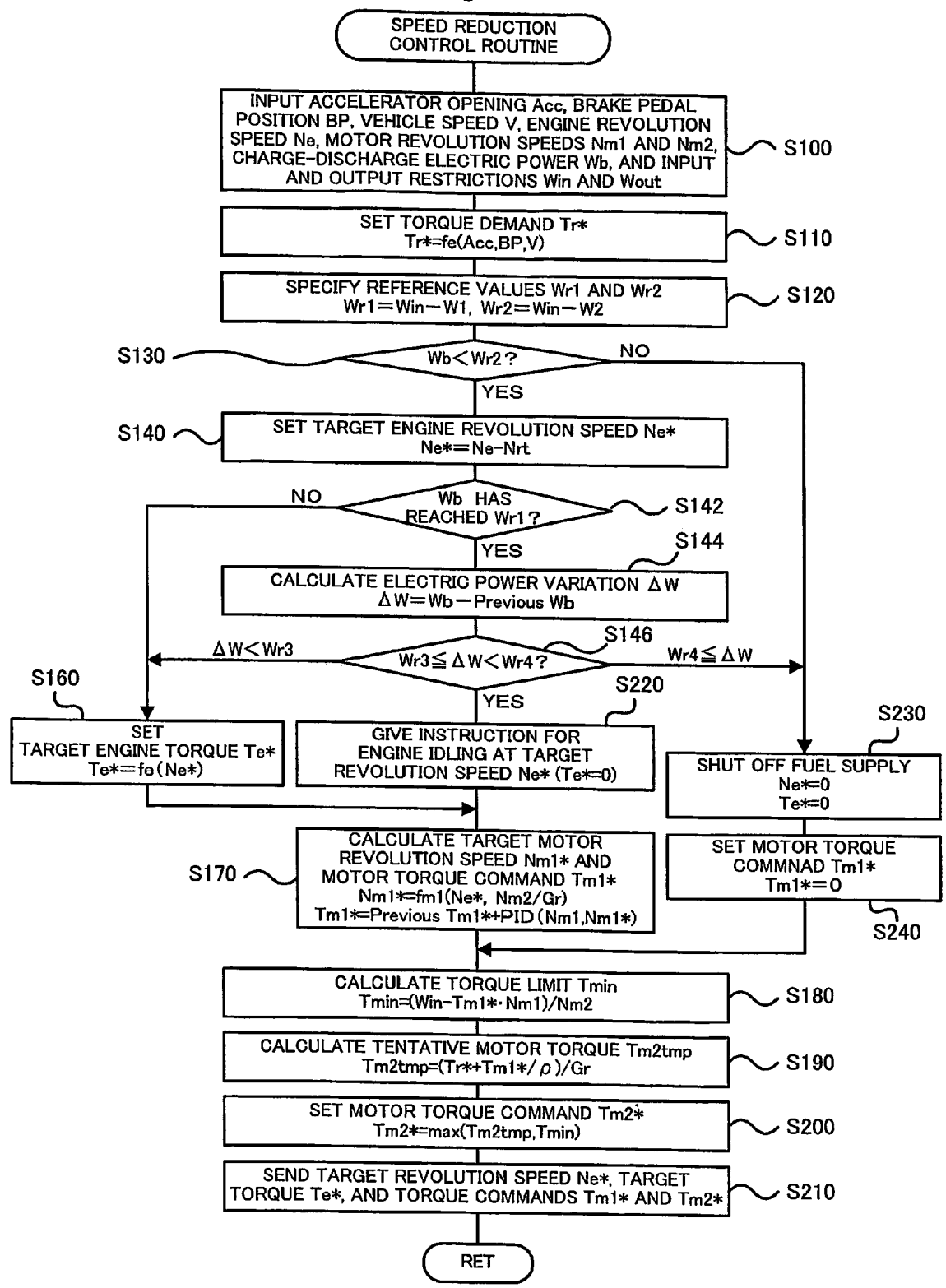
FIG. 8 is a flowchart showing a speed reduction control routine in one modified structure.

The hybrid vehicle 20 of the embodiment carries out the ordinary state varying control on the condition that the charge-discharge electric power Wb is less than the idling reference value Wr1, the idling state varying control on the condition that the charge-discharge electric power Wb is not less than the idling reference value Wr1 but is less than the fuel supply shutoff reference value Wr2, and the fuel supply shutoff state varying control on the condition that the charge-discharge electric power Wb is not less than the fuel supply shutoff reference value Wr2. One modified procedure may select the control mode among the ordinary state varying control, the idling state varying control, and the fuel supply shutoff state varying control, based on the degree of variation in charge-discharge electric power Wb that has reached the idling reference value Wr1. In this modified arrangement, another speed reduction control routine shown in FIG. 8 is executed, in place of the speed reduction control routine of FIG. 2. The processing of steps S101 to S140 and the processing of and after step S160 in this modified speed reduction control routine of FIG. 8 are identical with those of the same step numbers in the speed reduction control routine of FIG. 2. The different flow of processing at steps of and after S142 is thus briefly described here.

Referring to the flowchart of FIG. 8, when the charge-discharge electric power Wb has reached the idling reference value Wr1 (step S142), the modified speed reduction control routine subtracts the previous charge-discharge electric power Wb (expressed as Previous Wb) used in the previous cycle of this routine from the current charge-discharge electric power Wb to calculate an electric power variation ΔW (step S144). The routine compares the calculated electric power variation ΔW with threshold values Wr3 and Wr4 (step S146). The threshold value Wr3 is used as a criterion to determine the continuance or termination of the ordinary state varying control and has a relatively small setting. The threshold value Wr4 is used as a criterion to determine the execution or non-execution of the fuel supply shutoff state varying control and has a greater setting than the setting of the threshold value Wr3. The electric power variation ΔW represents a variation in charge-discharge electric power Wb against the frequency of activation of the speed reduction control routine and may be regarded as a differential value of the charge-discharge electric power Wb at the extreme. The comparison between the electric power variation ΔW and the threshold values Wr3 and Wr4 accordingly determines whether the variation in charge-discharge electric power Wb is moderate or abrupt. When the electric power variation ΔW is less than the threshold value Wr3, it is expected that the charge-discharge electric power Wb has only a small variation and will not abruptly reach or exceed the fuel supply shutoff reference value Wr2. The continuance of the ordinary state varying control is accordingly recommended. When the electric power variation ΔW is not less than the threshold value W4, on the other hand, it is expected that the charge-discharge electric power Wb has a remarkably large variation and will soon reach or exceed the fuel supply shutoff reference value W2. The immediate execution of the fuel supply shutoff state varying control is thus recommended. This modified procedure changes over the control mode, based on the results of the comparison. When the electric power variation ΔW is less than the threshold value Wr3, the routine sets the target torque Te* corresponding to the target revolution speed Ne* (step S160) and executes the ordinary state varying control to gradually lower the revolution speed Ne of the engine 22 with the torque output from the engine 22. When the electric power variation ΔW is not less than the threshold value Wr3 but is less than the threshold value Wr4, the routine sends an instruction for idling the engine 22 at the target revolution speed Ne* to the engine ECU 24 (step S220) and executes the idling state varying control to gradually lower the revolution speed Ne of the engine 22 while idling the engine 22. When the electric power variation ΔW is not less than the threshold value Wr4, the routine shuts off the fuel supply to the engine 22, sets the L value '0' to the torque command Tm1* of the motor MG1 (steps S230 and S240), and executes the fuel supply shutoff state varying control to shut-off the fuel supply to the engine 22. The modified speed reduction control routine of FIG. 8 executes the fuel supply shutoff state varying control when the charge-discharge electric power Wb becomes not less than the fuel supply shutoff reference value Wr2, in the same manner as the speed reduction control routine of FIG. 2.

The hybrid vehicle executes this modified speed reduction control routine (FIG. 8) to change over the control mode among the ordinary state varying control, the idling state varying control, and the fuel supply shutoff state varying control according to the degree of the variation in charge-discharge electric power Wb that has reached the idling reference value W1 set on the basis of the input restriction Win. The control mode is changed over, based on the estimation of the charge-discharge electric power Wb in the immediate future. This modified arrangement thus effectively prevents the battery 50 from being charged with excessive electric power. The ordinary state varying control and the idling state varying control smoothly lower the revolution speed Ne of the engine 22, while ensuring a sufficiently or relatively quick response to the driver's subsequent step-on action of the accelerator pedal 83.

The modified speed reduction control routine (FIG. 8) changes over the control mode to the fuel supply shutoff state varying control when the charge-discharge electric power Wb is not less than the fuel supply shutoff reference value Wr2. Another possible modification may not compare the charge-discharge electric power Wb with the fuel supply shutoff reference value Wr2. This modified procedure changes over the control mode, based on the results of the comparison between the charge-discharge electric power Wb and the idling reference value Wr1 and the subsequent comparison between the electric power variation ΔW and the threshold values Wr3 and Wr4.

The modified speed reduction control routine (FIG. 8) compares the electric power variation ΔW with the threshold values Wr3 and Wr4. This routine selects the ordinary state varying control when the electric power variation ΔW is less than the threshold value Wr3, the idling state varying control when the electric power variation ΔW is not less than the threshold value Wr3 but is less than the threshold value Wr4, and the fuel supply shutoff state varying control when the electric power variation ΔW is not less than the threshold value Wr4. Another possible modification may compare the electric power variation ΔW with only the threshold value Wr4. This modified procedure executes the idling state varying control when the electric power variation ΔW is less than the threshold value Wr4, while executing the fuel supply shutoff varying control when the electric power variation ΔW is not less than the threshold value Wr4. Namely the ordinary state varying control is terminated when the charge-discharge electric power Wb becomes not less than the idling reference value Wr1.

Figure 9:
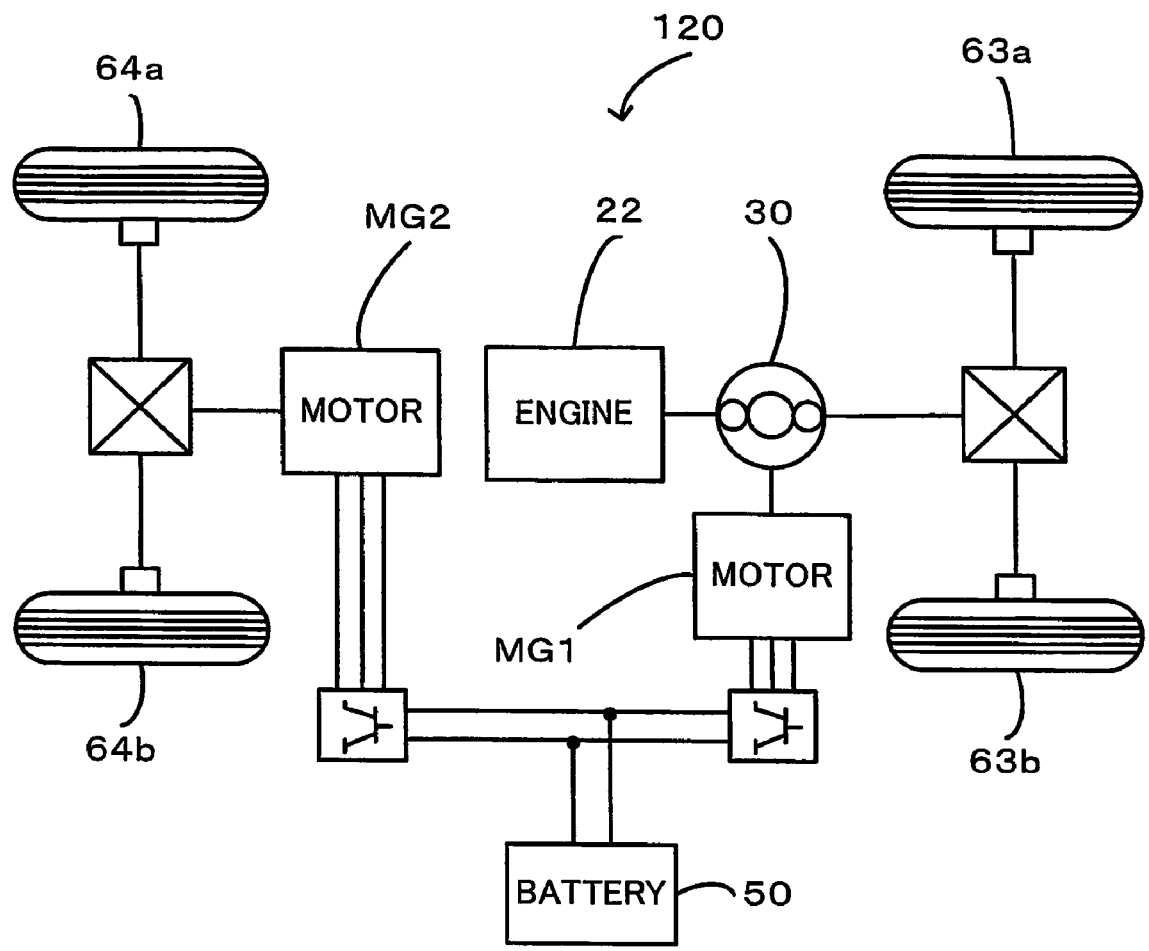
FIG. 9 schematically illustrates the construction of a hybrid vehicle 20 in one modified structure.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 9, the power of the motor MG2 may be output to another axle (that is, an axle linked with wheels 64a and 64b), which is different from an axle connected with the ring gear shaft 32a (that is, an axle linked with the wheels 63a and 63b).

Figure 10:
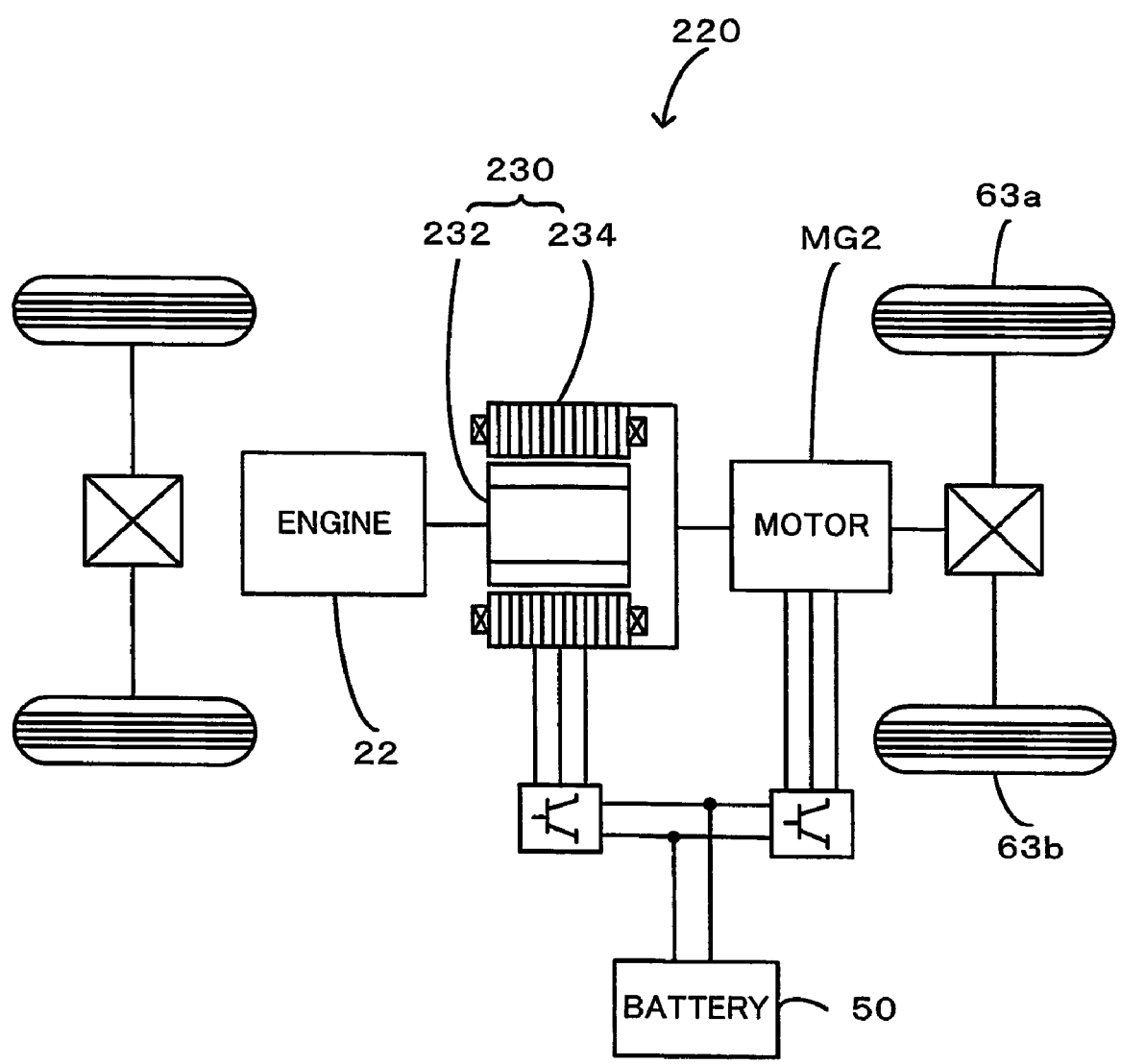
FIG. 10 schematically illustrates the construction of a hybrid vehicle 20 in another modified structure.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 10, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is applicable to automobile and other manufacturing industries.

The invention claimed is:

1. A power output apparatus that outputs power to a drive shaft, said power output apparatus comprising:
    an internal combustion engine;
    an electric power-mechanical power input-output unit that is linked with an output shaft of said internal combustion engine and with the drive shaft to maintain or vary a driving state of said internal combustion engine and to output at least part of power from said internal combustion engine to the drive shaft through inputs and outputs of electric power and mechanical power;
    a motor that is capable of inputting and outputting power from and to the drive shaft;
    a secondary battery that is capable of supplying and receiving electric power to and from said electric power-mechanical power input-output unit and said motor;
    an input restriction setting module that sets an input restriction of said secondary battery;
    a charge-discharge electric power measurement module that measures a charge-discharge electric power used to charge said secondary battery or obtained by discharging said secondary battery;
    a power demand setting module that sets a power demand required to the drive shaft, in response to an operator's manipulation;
    a driving state varying mode changeover module that, in response to setting of an abruptly decreasing power demand by said power demand setting module, selects a driving state varying mode to vary the driving state of said internal combustion engine, based on the charge-discharge electric power measured by said charge-discharge electric power measurement module and the input restriction set by said input restriction setting module; and
    a controller that controls said internal combustion engine, said electric power-mechanical power input-output unit, and said motor to ensure a variation in driving state of said internal combustion engine in the selected driving state varying mode and output of a power corresponding to the setting of the power demand to the drive shaft,
    wherein said driving state varying mode changeover module selects an ordinary state varying mode to gradually vary the driving state of said internal combustion engine when the measured charge-discharge electric power is less than a predetermined first electric power set on the basis of the input restriction, said driving state varying mode changeover module selecting an independent state varying mode to idle said internal combustion engine at a specified revolution speed without torque output and thereby vary the driving state of said internal combustion engine when the measured charge-discharge electric power is not less than the predetermined first electric power but is less than a predetermined second electric power set on the basis of the input restriction, said driving state varying mode changeover module selecting a fuel supply shutoff state varying mode to shut off fuel supply to said internal combustion engine and thereby vary the driving state of said internal combustion engine when the measured charge-discharge electric power is not less than the predetermined second electric power.

2. A power output apparatus in accordance with claim 1, wherein the predetermined second electric power is set to be a lower level than the input restriction.

3. A power output apparatus in accordance with claim 1, wherein the predetermined second electric power is set to be a higher level than the input restriction.

4. A power output apparatus in accordance with claim 1, wherein the predetermined first electric power is set to be a lower level than the input restriction.

5. A power output apparatus in accordance with claim 1, wherein said electric power-mechanical power input-output unit comprises:
- a three-shaft power input-output assembly that is connected with three shafts, that is, said output shaft of said internal combustion engine, said drive shaft, and a third shaft, and specifies input and output of power from and to one residual shaft among said three shafts, based on powers input and output from and to two shafts among said three shafts; and
- a generator that inputs and outputs power from and to said third shaft.

6. A power output apparatus in accordance with claim 1, wherein said electric power-mechanical power input-output unit comprises a pair-rotor generator having a first rotor, which is linked with the output shaft of said internal combustion engine, and a second rotor, which is linked with said drive shaft and rotates relative to the first rotor, said pair-rotor generator outputting at least part of the power from said internal combustion engine to said drive shaft through input and output of electric power by electromagnetic interaction between the first rotor and the second rotor.

7. A power output apparatus that outputs power to a drive shaft, said power output apparatus comprising:
- an internal combustion engine;
- an electric power-mechanical power input-output unit that is linked with an output shaft of said internal combustion engine and with the drive shaft to maintain or vary a driving state of said internal combustion engine and to output at least part of power from said internal combustion engine to the drive shaft through inputs and outputs of electric power and mechanical power;
- a motor that is capable of inputting and outputting power from and to the drive shaft;
- a secondary battery that is capable of supplying and receiving electric power to and from said electric power-mechanical power input-output unit and said motor;
- an input restriction setting module that sets an input restriction of said secondary battery;
- a charge-discharge electric power measurement module that measures a charge-discharge electric power used to charge said secondary battery or obtained by discharging said secondary battery;
- a power demand setting module that sets a power demand required to the drive shaft, in response to an operator's manipulation;
- a driving state varying mode changeover module that, in response to setting of an abruptly decreasing power demand by said power demand setting module, selects a driving state varying mode to vary the driving state of said internal combustion engine, based on the charge-discharge electric power measured by said charge-discharge electric power measurement module and the input restriction set by said input restriction setting module; and
- a controller that controls said internal combustion engine, said electric power-mechanical power input-output unit, and said motor to ensure a variation in driving state of said internal combustion engine in the selected driving state varying mode and output of a power corresponding to the setting of the power demand to the drive shaft, wherein said driving state varying mode changeover module selects the driving state varying mode of said internal combustion engine, based on a degree of a variation in measured charge-discharge electric power that has reached a predetermined first electric power set on the basis of the input restriction, wherein said driving state varying mode changeover module selects an ordinary state varying mode to gradually vary the driving state of said internal combustion engine when the degree of the variation in measured charge-discharge electric power is less than a predetermined first level, said driving state varying mode changeover module selecting an independent state varying mode to idle said internal combustion engine at a specified revolution speed without torque output and thereby vary the driving state of said internal combustion engine when the degree of the variation in measured charge-discharge electric power is not less than the predetermined first level but is less than a predetermined second level, said driving state varying mode changeover module selecting a fuel supply shutoff state varying mode to shut off fuel supply to said internal combustion engine and thereby vary the driving state of said internal combustion engine when the degree of the variation in measured charge-discharge electric power is not less than the predetermined second level.

8. A power output apparatus in accordance with claim 7, wherein said driving state varying mode changeover module adopts the fuel supply shutoff state varying mode, regardless of the selected driving state varying mode when the measured charge-discharge electric power has reached the predetermined first electric power, on the condition that the measured charge-discharge electric power is not less than a predetermined second electric power, which is set on the basis of the input restriction to be greater than the predetermined first electric power.

9. A power output apparatus in accordance with claim 8, wherein the predetermined second electric power is set to be a lower level than the input restriction.

10. A power output apparatus in accordance with claim 8, wherein the predetermined second electric power is set to be a higher level than the input restriction.

11. An automobile, comprising:
- an internal combustion engine;
- an electric power-mechanical power input-output unit that is linked with an output shaft of said internal combustion engine and with a drive shaft connecting to an axle to maintain or vary a driving state of said internal combustion engine and to output at least part of power from said internal combustion engine to the drive shaft through inputs and outputs of electric power and mechanical power;
- a motor that is capable of inputting and outputting power from and to the drive shaft;
- a secondary battery that is capable of supplying and receiving electric power to and from said electric power-mechanical power input-output unit and said motor;
- an input restriction setting module that sets an input restriction of said secondary battery;
- a charge-discharge electric power measurement module that measures a charge-discharge electric power used to charge said secondary battery or obtained by discharging said secondary battery;
- a power demand setting module that sets a power demand required to the drive shaft, in response to an operator's manipulation;
- a driving state varying mode changeover module that, in response to setting of an abruptly decreasing power demand by said power demand setting module, selects a driving state varying mode to vary the driving state of said internal combustion engine, based on the charge-discharge electric power measured by said charge-discharge electric power measurement module and the input restriction set by said input restriction setting module; and a controller that controls said internal combustion engine, said electric power-mechanical power input-output unit, and said motor to ensure a variation in driving state of said internal combustion engine in the selected driving state varying mode and output of a power corresponding to the setting of the power demand to the drive shaft, wherein said driving state varying mode changeover module selects the driving state varying mode of said internal combustion engine, based on a degree of a variation in measured charge-discharge electric power that has reached a predetermined first electric power set on the basis of the input restriction, wherein said driving state varying mode changeover module selects an ordinary state varying mode to gradually vary the driving state of said internal combustion engine when the degree of the variation in measured charge-discharge electric power is less than a predetermined first level, said driving state varying mode changeover module selecting an independent state varying mode to idle said internal combustion engine at a specified revolution speed without torque output and thereby vary the driving state of said internal combustion engine when the degree of the variation in measured charge-discharge electric power is not less than the predetermined first level but is less than a predetermined second level, said driving state varying mode changeover module selecting a fuel supply shutoff state varying mode to shut off fuel supply to said internal combustion engine and thereby vary the driving state of said internal combustion engine when the degree of the variation in measured charge-discharge electric power is not less than the predetermined second level.

12. An automobile in accordance with claim 11, wherein said driving state varying mode changeover module adopts the fuel supply shutoff state varying mode, regardless of the selected driving state varying mode when the measured charge-discharge electric power has reached the predetermined first electric power, on the condition that the measured charge-discharge electric power is not less than a predetermined second electric power, which is set on the basis of the input restriction to be greater than the predetermined first electric power.

13. An automobile in accordance with claim 11, wherein said electric power-mechanical power input-output unit comprises:

a three-shaft power input-output assembly that is connected with three shafts, that is, said output shaft of said internal combustion engine, said drive shaft, and a third shaft, and specifies input and output of power from and to one residual shaft among said three shafts, based on powers input and output from and to two shafts among said three shafts; and a generator that inputs and outputs power from and to said third shaft.

14. An automobile in accordance with claim 11, wherein said electric power-mechanical power input-output unit comprises a pair-rotor generator having a first rotor, which is linked with the output shaft of said internal combustion engine, and a second rotor, which is linked with said drive shaft and rotates relative to the first rotor, said pair-rotor generator outputting at least part of the power from said internal combustion engine to said drive shaft through input and output of electric power by electromagnetic interaction between the first rotor and the second rotor.

15. A control method of a power output apparatus that comprises: an internal combustion engine; an electric power-mechanical power input-output unit that is linked with an output shaft of said internal combustion engine and with a drive shaft to maintain or vary a driving state of said internal combustion engine and to output at least part of power from said internal combustion engine to the drive shaft through inputs and outputs of electric power and mechanical power; a motor that is capable of inputting and outputting power from and to the drive shaft; and a secondary battery that is capable of supplying and receiving electric power to and from said electric power-mechanical power input-output unit and said motor, said control method comprising the steps of:

(a) setting an input restriction of said secondary battery;

(b) measuring a charge-discharge electric power used to charge said secondary battery or obtained by discharging said secondary battery;

(c) setting a power demand required to the drive shaft, in response to an operator's manipulation;

(d) in response to setting of an abruptly decreasing power demand by said step (c), selecting a driving state varying mode to vary the driving state of said internal combustion engine, based on the measured charge-discharge electric power and the setting of the input restriction; and (e) controlling said internal combustion engine, said electric power-mechanical power input-output unit, and said motor to ensure a variation in driving state of said internal combustion engine in the selected driving state varying mode and output of a power corresponding to the setting of the power demand to the drive shaft, wherein said step (d) selects an ordinary state varying mode to gradually vary the driving state of said internal combustion engine when the measured charge-discharge electric power is less than a predetermined first electric power set on the basis of the input restriction, said step (d) selecting an independent state varying mode to idle said internal combustion engine at a specified revolution speed without torque output and thereby vary the driving state of said internal combustion engine when the measured charge-discharge electric power is not less than the predetermined first electric power but is less than a predetermined second electric power set on the basis of the input restriction, said step (d) selecting a fuel supply shutoff state varying mode to shut off fuel supply to said internal combustion engine and thereby vary the driving state of said internal combustion engine when the measured charge-discharge electric power is not less than the predetermined second electric power.

16. A control method of a power output apparatus that comprises: an internal combustion engine; an electric power-mechanical power input-output unit that is linked with an output shaft of said internal combustion engine and with a drive shaft to maintain or vary a driving state of said internal combustion engine and to output at least part of power from said internal combustion engine to the drive shaft through inputs and outputs of electric power and mechanical power; a motor that is capable of inputting and outputting power from and to the drive shaft; and a secondary battery that is capable of supplying and receiving electric power to and from said electric power-mechanical power input-output unit and said motor, said control method comprising the steps of:
(a) setting an input restriction of said secondary battery;
(b) measuring a charge-discharge electric power used to charge said secondary battery or obtained by discharging said secondary battery;
(c) setting a power demand required to the drive shaft, in response to an operator's manipulation;
(d) in response to setting of an abruptly decreasing power demand by said step (c), selecting a driving state varying mode to vary the driving state of said internal combustion engine, based on the measured charge-discharge electric power and the setting of the input restriction; and
(e) controlling said internal combustion engine, said electric power-mechanical power input-output unit, and said motor to ensure a variation in driving state of said internal combustion engine in the selected driving state varying mode and output of a power corresponding to the setting of the power demand to the drive shaft,
wherein said step (d) selects an ordinary state varying mode to gradually vary the driving state of said internal combustion engine when a degree of a variation in measured charge-discharge electric power, which has reached a predetermined first electric power set on the basis of the input restriction, is less than a predetermined first level, said step (d) selecting an independent state varying mode to idle said internal combustion engine at a specified revolution speed without torque output and thereby vary the driving state of said internal combustion engine when the degree of the variation in measured charge-discharge electric power is not less than the predetermined first level but is less than a predetermined second level, said step (d) selecting a fuel supply shutoff state varying mode to shut off fuel supply to said internal combustion engine and thereby vary the driving state of said internal combustion engine when the degree of the variation in measured charge-discharge electric power is not less than the predetermined second level.

* * * * *